(12) United States Patent
Moon et al.

(10) Patent No.: US 12,119,963 B2
(45) Date of Patent: Oct. 15, 2024

(54) FEED FORWARD EQUALIZER AND SYSTEM INCLUDING THE SAME

(71) Applicant: SAMSUNG ELECTRONICS CO., LTD., Suwon-si (KR)

(72) Inventors: Changjae Moon, Pohang-si (KR); Byungsub Kim, Pohang-si (KR)

(73) Assignee: Samsung Electronics Co., Ltd. (KR)

( * ) Notice: Subject to any disclaimer, the term of this patent is extended or adjusted under 35 U.S.C. 154(b) by 4 days.

(21) Appl. No.: 18/144,331

(22) Filed: May 8, 2023

(65) Prior Publication Data

US 2023/0370309 A1    Nov. 16, 2023

(30) Foreign Application Priority Data

May 10, 2022 (KR) .......................... 10-2022-0057392
Aug. 30, 2022 (KR) .......................... 10-2022-0108990

(51) Int. Cl.
    *H04L 25/03*      (2006.01)
    *H04L 25/06*      (2006.01)

(52) U.S. Cl.
    CPC ...... *H04L 25/03006* (2013.01); *H04L 25/062* (2013.01); *H04L 2025/03471* (2013.01)

(58) Field of Classification Search
    CPC ............ H04L 25/03006; H04L 25/062; H04B 10/697; H04B 10/6971; H04B 3/235; H04B 3/04; H04B 3/06; H04B 3/46
See application file for complete search history.

(56) References Cited

U.S. PATENT DOCUMENTS

| | | | |
|---|---|---|---|
| 7,551,667 B2 | 6/2009 | Christensen | |
| 9,503,293 B2 * | 11/2016 | Kim | ................. H04L 25/03343 |
| 10,298,420 B1 | 5/2019 | Chada et al. | |
| 11,153,129 B1 | 10/2021 | Toprak-Deniz et al. | |
| 11,206,159 B2 | 12/2021 | Wu et al. | |
| 2011/0182347 A1 * | 7/2011 | Cheung | .................... H04B 3/06 375/232 |

(Continued)

FOREIGN PATENT DOCUMENTS

| | | |
|---|---|---|
| JP | 2021-013076 A | 2/2021 |
| KR | 10-2002-0034320 | 5/2002 |
| KR | 10-1709910 | 2/2017 |

OTHER PUBLICATIONS

Changjae Moon et al., "A 20 GB/S/Pin 1.18PJ/B 1149μM2 Single-Ended Inverter-Based 4-Tap Addition-Only Feed-Forward Equalization Transmitter With Improved Robustness to Coefficient Errors in 28NM CMOS", 2022 IEEE International Solid-State Circuits Conference (ISSCC), Feb. 2022, San Francisco, CA, USA.

(Continued)

*Primary Examiner* — Khanh C Tran
(74) *Attorney, Agent, or Firm* — Fish & Richardson P.C.

(57) ABSTRACT

A feed forward equalizer includes a plurality of delay circuits connected to each other in series and configured to delay input signals. A plurality of filters respectively correspond to outputs of the plurality of delay circuits, except for a reference output which is an output of a first delay circuit among the plurality of delay circuits, and the input signals. A calculator configured to sum the reference output and outputs of the plurality of filters. Each of the plurality of filters is configured to receive an output of a delay circuit corresponding thereto, among the plurality of filters, and the reference output.

20 Claims, 15 Drawing Sheets

(56) References Cited

U.S. PATENT DOCUMENTS

2018/0197593 A1* 7/2018 Lee .......................... G11C 7/12
2022/0360476 A1* 11/2022 Palusa .................... H03K 5/135

OTHER PUBLICATIONS

M. Choi et al. "An FFE Transmitter Which Automatically and Adaptively Relaxes Impedance Matching," IEEE JSSC, vol. 53, No. 6, pp. 1780-1792, Jun. 2018.

S. Han et al. "A Coefficient-Error-Robust FFE TX with 230% Eye Variation Improvement Without Calibration in 65nm CMOS Technology," ISSCC, pp. 50-51, 2014.

S. Lee et al. "An 8nm 18Gb/s/pin GDDR6 PHY with TX Bandwidth Extension and RX Training Technique," ISSCC, pp. 338-339, 2020.

B. Dehlaghi et al. "A 0.3 pj/bit 20Gb/s/Wire Parallel Interface for Die-to-Die Communication," IEEE JSSC, vol. 51, No. 11, pp. 2690-2701, Nov. 2016.

B. Kim et al. "A 4Gb/s/ch 356fJ/b 10mm Equalized On-chip Interconnect with Nonlinear Charge-Injecting Transmit Filter and Transimpedance Receiver in 90nm CMOS" ISSCC, pp. 66-67, 2009.

* cited by examiner

| x[n-k] | x[n-N] | OUT |
|---|---|---|
| -1 | -1 | 0 |
| -1 | +1 | +1 |
| +1 | -1 | -1 |
| +1 | +1 | 0 |

TABLE 1

| x[n−k] | x[n−N] | OUT |
|---|---|---|
| −1 | −1 | −1 |
| −1 | +1 | 0 |
| +1 | −1 | 0 |
| +1 | +1 | +1 |

TABLE 2

FEED FORWARD EQUALIZER AND SYSTEM INCLUDING THE SAME

CROSS-REFERENCE TO RELATED APPLICATIONS

A claim of priority under 35 U.S.C. § 119 is made to Korean Patent Application Nos. 10-2022-0057392 filed on May 10, 2022, and 10-2022-0108990 filed on Aug. 30, 2022, in the Korean Intellectual Property Office, the disclosures of which are incorporated by reference herein in their entireties.

BACKGROUND

The disclosure relates to a feed forward equalizer and, more particularly, to a feed forward equalizer which achieves equalization using a summing computation of data signals to be transmitted and to a system including the feed forward equalizer.

Interface technologies are required to facilitate transmission and reception of vast amounts of data signals between devices. The devices may be connected via channels transmitting the data signals. However, due to various factors, such as surface effect and dielectric loss, the data signals transmitted via the channels may include noise, such as inter-symbol interference (ISI), and the quality of the data signals transmitted at a fast speed may be degraded.

Thus, to improve the quality of the data signals transmitted and received, the devices may include a feed forward equalizer, which drives the data signals to be transmitted considering various factors. However, due to an additional area and parasitic capacitance, which are caused by resistance for linearity and impedance matching, there have been issues in that a large amount of high power is consumed and a smooth equalization operation is difficult due to unintentional power leakage.

SUMMARY

According to an aspect of the disclosure, there is provided a feed forward equalizer including a plurality of delay circuits connected to each other in series and configured to delay input signals; a plurality of filters respectively corresponding to outputs of the plurality of delay circuits except for a reference output, which is an output of a first delay circuit among the plurality of delay circuits, and the input signals; and a calculator configured to sum the reference output and outputs of the plurality of filters. Each of the plurality of filters is configured to receive an output of a delay circuit corresponding thereto, among the plurality of filters, and the reference output.

According to another aspect of the disclosure, there is provided a feed forward equalizer including a delay circuit configured to receive input data, a decoding circuit configured to receive output data of the delay circuit, and a calculator configured to sum outputs of the decoding circuit. The delay circuit includes a plurality of latch circuits configured to output a plurality of tap signals by sequentially delaying the input data. The decoding circuit includes a plurality of decoders configured to perform a decoding operation corresponding to each of the plurality of tap signals except for a reference tap signal, which is a tap signal of a first latch circuit. Each of the plurality of decoders is configured to perform the decoding operation by receiving the reference tap signal and a tap signal corresponding thereto among the plurality of decoders.

According to another aspect of the disclosure, there is provided a feed forward equalizer including a first delay circuit and a second delay circuit configured to receive a first input signal and a second input signal and to delay the first input signal and the second input signal by using a plurality of latch circuits, respectively. A first decoding circuit and a second decoding circuit are configured to generate a plurality of decoding signals by decoding output signals of the first delay circuit and the second delay circuit, respectively. A first multiplexer is configured to receive the plurality of decoding signals of the first and second decoding circuits. A second multiplexer is configured to receive a first reference output, which is an output of a first latch circuit of the first delay circuit, and a second reference output, which is an output of a second latch circuit of the second delay circuit. A summing driver is configured to receive and sum outputs of the first and second multiplexers. The decoding circuit includes a plurality of decoders respectively corresponding to the outputs of the plurality of latch circuits, except for the first and second reference outputs, for performing a decoding operation.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments of the disclosure will be described in detail with reference to the accompanying drawings.

Figure 1:
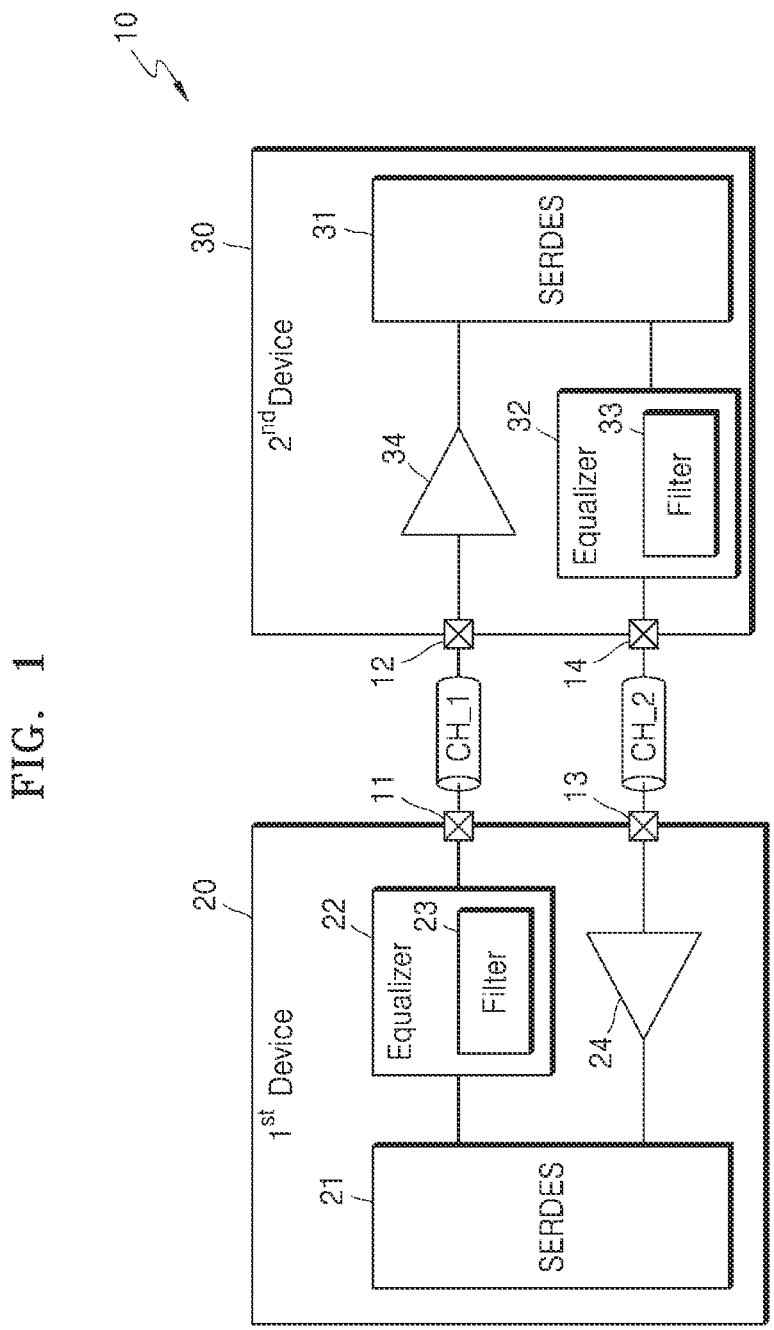
FIG. 1 is a schematic block diagram of a transmission/reception system according to an embodiment.

FIG. 1 is a schematic block diagram of a transmission/reception system 10 according to an embodiment.

The transmission/reception system 10 may include a first device 20 and a second device 30. The first device 20 and the second device 30 may each be referred to as an electronic device, examples of which include a desktop computer, a laptop computer, a tablet computer, a smartphone, a wearable device, a video game machine, a home appliance, and a medical device. The first and second devices 20 and 30 may be the same type of electronic device or different types of electronic devices.

However, the disclosure is not limited thereto and, in some embodiments, the transmission/reception system 10 may be implemented as a single electronic device. For example, each of the first device 20 and the second device 30 may each include a component or intellectual property (IP) included in a single electronic device, examples of which include a circuit, a module, a chip, and/or a package-level entity. In this case, the first and second devices 20 and 30 may be the same type of component or IP or different types of components or IP. In some embodiments, the first device 20 and the second device 30 may be implemented as part of a single circuit, a single module, a single chip, and/or a single package-level entity. It will be clearly understood that the terms, such as system and device, are presented to enable better understanding and that the disclosure is not limited thereto.

The first device 20 and the second device 30 may communicate with each other to exchange data signals via a first channel CH_1 and a second channel CH_2. Each of the first channel CH_1 and the second channel CH_2 may include a conductive material to transmit data signals. As an example, each of the first channel CH_1 and the second channel CH_2 may be implemented as a trace pattern on a printed circuit board (PCB), a conductive wire of a cable, a metal pin/pad of a connector, etc.

The first device 20 may include a transmission pad 11, a reception pad 13, an equalizer 22, a receiver 24, and a serializer/de-serializer (SERDES) 21. In addition, the equalizer 22 may include a filter 23 to perform an equalization operation on a data signal. The second device 30 may include a reception pad 12, a transmission pad 14, a receiver 34, an equalizer 32, and a SERDES 31. Similarly, the equalizer 32 may include a filter 33 to perform an equalization operation on a data signal. Although FIG. 1 discloses minimum configurations of the first device 20 and the second device 30 to explain the technical idea of the disclosure, the embodiment is not limited thereto and the first device 20 and the second device 30 may further include functional circuits (for example, controllers, processors, memories, image sensors, displays, or the like), clock and data recovery (CDR) circuits, receivers, etc.

Each of the first device 20 and the second device 30 may be implemented as separate components, IPs, or electronic devices. In some configurations, the first device 20 may be an external device with respect to the second device 30 and the second device 30 may be mutually recognized as an external device with respect to the first device 20.

Hereinafter, transmission of a data signal from the first device 20 to the second device 30 is described. The SERDES 21 may serialize the data signal generated according to operations of functional circuits (not illustrated) in the first device 20. The equalizer 22 may be coupled to the transmission pad 11. The SERDES 21 provides the serialized data signal to the equalizer 22, and the equalizer 22 may perform an equalization operation according to embodiments on the received serialized data signal using the filter 23. Next, the equalizer 22 may transmit the equalized data signal to the second device 30 via the transmission pad 11 and the first channel CH_1. The receiver 34 of the second device 30 may receive the equalized data signal via the reception pad 12 and transmit the received equalized data signal to the SERDES 31. The SERDES 31 may parallelize the equalized data signal and provide the parallelized data signal to functional circuits (not illustrated) in the second device 30.

Hereinafter, transmission of a data signal from the second device 30 to the first device 20 is described.

The SERDES 31 may serialize a data signal generated according to operations of functional circuits (not illustrated) in the second device 30. The equalizer 32 may be coupled to the transmission pad 14. The SERDES 31 may provide the serialized data signal to the equalizer 32, and the equalizer 32 may perform an equalization operation according to embodiments on the received serialized data signal using the filter 33. Next, the equalizer 32 may transmit the equalized data signal to the first device 20 via the transmission pad 14 and the second channel CH_2. The receiver 24 of the first device 20 may receive the equalized data signal via the reception pad 13 and transmit the received equalized data signal to the SERDES 21. The SERDES 21 may parallelize the equalized data signal and provide the parallelized equalized data signal to functional circuits (not illustrated) in the first device 20.

Due to various factors, such as surface effects and dielectric loss of the first channel CH_1 and the second channel CH_2 in communication between the first device 20 and the second device 30, each of the first channel CH_1 and the second channel CH_2 may exhibit low-pass frequency response characteristics. Accordingly, bandwidths of the first channel CH_1 and the second channel CH_2 may be limited in a high-speed operation and may be less than bandwidths of data signals. This fact may weaken high frequency components of data signals transmitted via the first channel CH_1 and the second channel CH_2 and may cause inter-symbol interference (ISI) in the time domain. To improve the ISI, the equalizers 22 and 32 may perform an equalization operation according to embodiments on the data signals to be transmitted by using the filters 23 and 33 of each of the equalizers 22 and 32.

The equalizers 22 and 32 according to embodiments may be implemented as a feed forward equalizer. The equalizers 22 and 32 may include at least one of the filters 23 and 33, respectively. The equalizers 22 and 32 may receive data to be transmitted and may perform a compensation operation to improve issues caused by ISI based on the operations of the filters 23 and 33, respectively.

Hereinafter, the equalizer 22 of the first device 20 is mainly described and the same descriptions may also be applied to the second device 30. As an embodiment, the equalizer 22 may receive data to be transmitted and may perform an equalization operation only by using a summing operation without a subtraction operation by using the filter 23. Details of this are described below. The equalizer 22 may include a delay circuit, and the delay circuit may include a plurality of latch circuits to delay the received data signal. The latch circuit may be defined as a circuit including at least one latch. For example, the equalizer 22 may be implemented in a k-stage (k is an integer of 2 or more) latch structure. For example, the equalizer 22 may include an input latch circuit configured to determine the value of data included in the received data signal and latch the value of data, an intermediate latch circuit configured to receive an output including the value of the data latched from the input latch circuit, and an output latch circuit configured to produce the output synchronously with a certain clock signal. However, this configuration is only an example embodiment and the equalizer 22 may be implemented in various latch structures.

As described above, because the data may be affected or distorted by noise due to ISI or the like, the second device 30 receiving the data may not accurately determine the value of the data. To improve on this phenomenon, the equalizer 22 may drive the data signal to be transmitted based on the filter 23, and thus, the second device 30 may receive the data more accurately. In an embodiment, the equalizer 22 may perform a driving operation considering ISI by adjusting driving strengths of currents and/or voltages, by using a driver circuit, on the data to be transmitted via the filter 23. Details of this are described later.

The equalizers 22 and 32 according to an embodiment may, as to be described below in detail, through a driver based on a pull up circuit and a pull down circuit, reduce an additional area and the parasitic capacitance (for example, in a source-series termination (SST) driver) due to resistance for linearity and impedance matching. Accordingly, the equalizer 22 according to embodiments may occupy a small area and increase power efficiency.

In addition, because the equalizers 22 and 32 perform a driving operation using only an adder, the effects of noise generated by a subtraction operation (for example, power supply noise), leakage current, mismatch between transistors, PVT variation, or the like may be reduced, and in this manner, the output voltage may be smoothly adjusted to a desired value. Accordingly, the equalizers 22 and 32 according to an embodiment may have an effect of performing a smooth and improved equalization operation.

Figure 2:
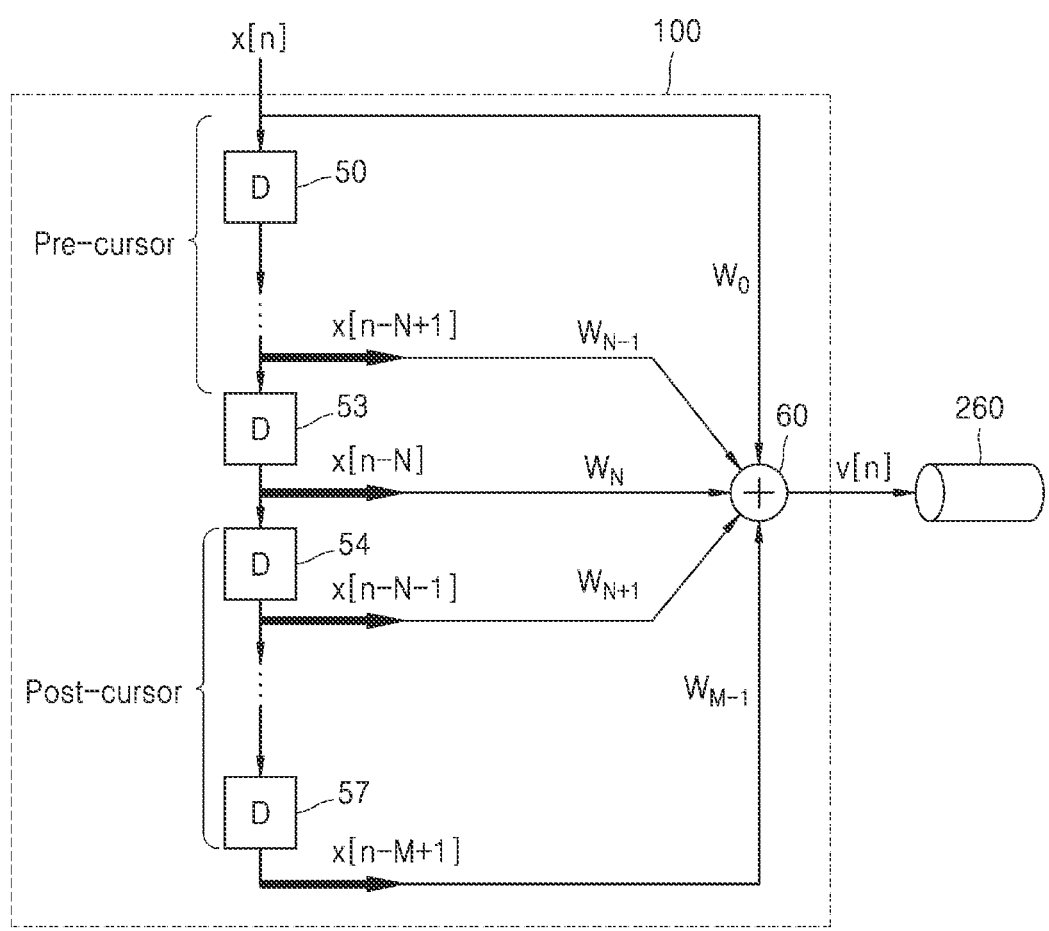
FIG. 2 is a schematic circuit diagram of a feed forward equalizer of a comparative example.

FIG. 2 is a schematic circuit diagram of a feed forward equalizer 100 of a comparative example.

Referring to FIGS. 1 and 2, the feed forward equalizer 100 of the comparative example may include a plurality of delay circuits 50, ..., 53, 54, ..., and 57, and a calculator 60. The plurality of delay circuits 50, ..., 53, 54, ..., and 57 may be connected to each other in series, and may delay data. In other words, to equalize data to be transmitted, the plurality of delay circuits 50, ..., 53, 54, ..., and 57 may receive input data x[n].

The feed forward equalizer 100 of the comparative example may be expressed as a finite impulse response (FIR) filter having a tap coefficient W (W=[$W_0$, $W_1$, ..., $W_N$, ..., and $W_{M-1}$]$^T$). A first coefficient signal having information about the tap coefficient W may be received from the outside. The first coefficient signal may be set considering various factors, such as a skin effect, a dielectric loss, etc. The feed forward equalizer 100 of the comparative example having a value of an appropriate tap coefficient W may operate as a high pass filter to compensate for a channel loss, to convert a data signal x[n] received from the outside into a 2-level pulse amplitude modulation (PAM2) signal. The feed forward equalizer 100 of the comparative example may perform a driving operation according to a weight based on the tap coefficient W by using the calculator 60.

The data signal x[n] may be delayed by the plurality of delay circuits 50, ..., 53, 54, ..., and 57. In this case, the data signal x[n] is a sequence of transmitted data signals and may have the signal level value of 1 (bit '1') or −1 (bit '0'). Each of the plurality of delay circuits 50, ..., 53, 54, ..., and 57 may output a delayed signal x[n−k] (k is an integer of 0 or more). In this case, k may mean a delayed time until the data signal x[n] arrives at the transmission pad 11 via the feed forward equalizer 100. For example, the data signal x[n] may be delayed by using the delay circuit 50 closest to the data signal receiving end and may output the data signal x[n−1]. In a similar manner, each of the plurality of delay circuits 50, ..., 53, 54, ..., and 57 may output a delayed signal x[n−k].

The feed forward equalizer 100 of the comparative example may take an output of a first delay circuit 53 as a reference output x[n−N] among the plurality of delay circuits 50, ..., 53, 54, ..., and 57, as to be described below. The delay circuits 50, ..., and 53, which are toward the receiving end of the data signal x[n], with the reference output x[n−N] of the first delay circuit 53 as a reference, may be referred to as pre-cursor taps. In addition, the delayed circuits 54, ..., and 57, which are opposite to the receiving end of the data signal x[n], with the reference output x[n−N] of the first delay circuit 53 as a reference, may be referred to as post-cursor taps. The first delay circuit 53 may be referred to as a main-cursor tap. As described above, each of the outputs of the plurality of delay circuits 50, ..., 53, 54, ..., and 57 may have a tap coefficient W (W=[$W_0$, $W_1$, ..., $W_N$, ..., and $W_{M-1}$]$^T$) corresponding thereto. For example, a coefficient corresponding to the reference output x[n−N] of the first delay circuit 53, which is the main-cursor tap, may correspond to $W_N$ among the coefficients included in the first coefficient signal. Similarly, the coefficient corresponding to an output x[n−M+1] of the third delay circuit 57 among the delay circuits of the post-cursor tap may include $W_{M-1}$ among the coefficients included in the first coefficient signal.

The calculator 60 may perform a calculation on the outputs of the plurality of delay circuits 50, ..., 53, 54, ..., and 57 based on the first coefficient signal including information about the tap coefficient W. The calculator 60 may, by using a driver (for example, the SST), drive a first output signal v[n] based on the coefficients (that is, $W_0$, $W_1$, ..., $W_N$, ..., and $W_{M-1}$) included in the first coefficient signal corresponding to the outputs of the plurality of delay circuits 50, ..., 53, 54, ..., and 57 and based on the outputs of the plurality of delay circuits 50, ..., 53, 54, ..., and 57. In this process, because signals of the outputs of the plurality of delay circuits 50, ..., 53, 54, ..., and 57 may be different from signals of coefficients included in the first coefficient signal corresponding thereto, the calculator 60 may include both a subtractor and an adder. By using these calculation processes, the calculator 60 may output the first output signal v[n], which is a data signal, that is, the equalized data signal to be transmitted, and may transmit the output first output signal v[n] via a channel 260.

Figure 3:
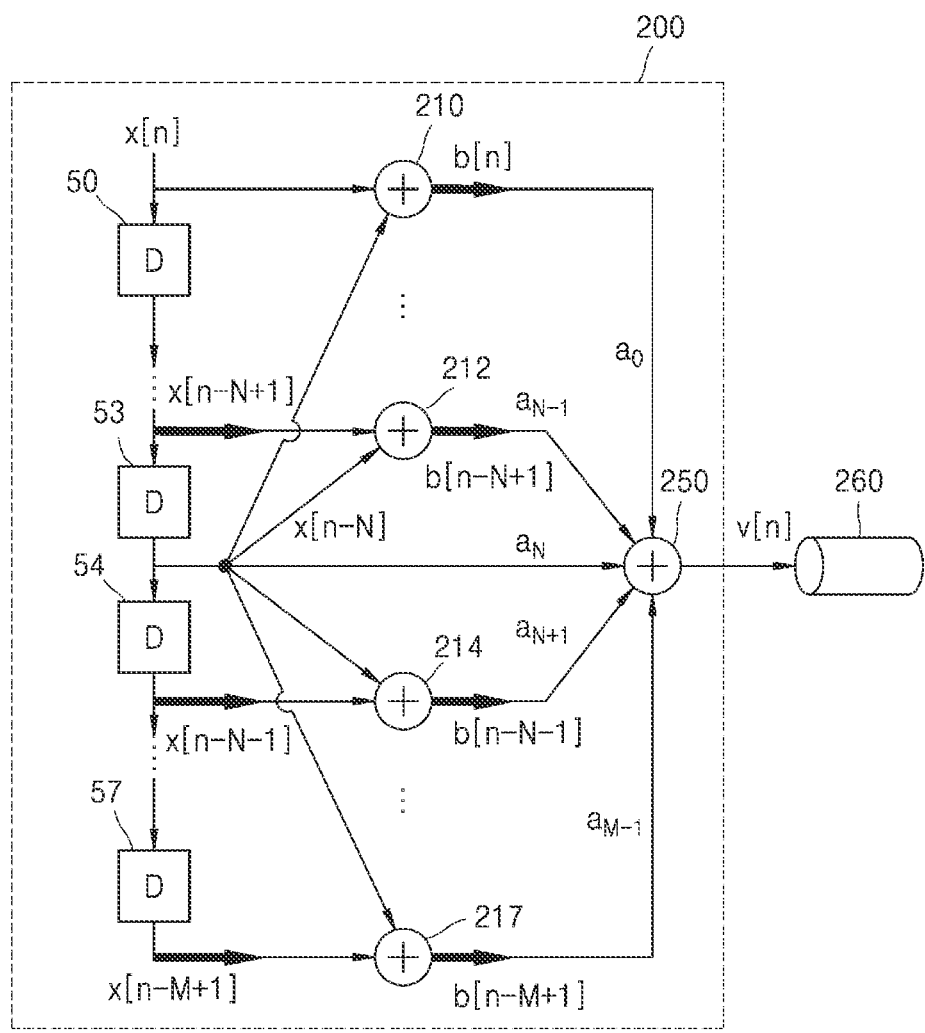
FIG. 3 is a schematic circuit diagram of a circuit of a feed forward equalizer, according to an embodiment.

FIG. 3 is a schematic circuit diagram of a feed forward equalizer 200, according to an embodiment.

Referring to FIGS. 2 and 3, the feed forward equalizer 200 may include the plurality of delay circuits 50, ..., 53, 54, ..., and 57, a plurality of filters 210, ..., 212, 214, ..., and 217, and a summing calculator 250. Each of the plurality of filters 210, ..., 212, 214, ..., and 217 may, as described below, be configured as a difference filter or an average filter. As described above, the feed forward equalizer 100 in FIG. 2 may have the tap coefficient W (W=[$W_0$, $W_1$, ..., $W_N$, ..., and $W_{M-1}$]$^T$). The feed forward equalizer 200 according to an embodiment may include the plurality of filters 210, ..., 212, 214, ..., and 217, and accordingly, as described below in detail, may have a new tap coefficient 'a' (a=[$a_0$, $a_1$, ..., and $a_{M-1}$]$^T$). In other words, each of the reference output x[n−N] and the plurality of filters 210, ..., 212, 214, ..., and 217 may have the new tap coefficient 'a' corresponding thereto. Likewise, a second coefficient signal (for example, Signal_a of FIG. 8) having information about the new tap coefficient 'a' may be received from the outside.

Each of the plurality of filters 210, ..., 212, 214, ..., and 217 may receive a respective output of the plurality of delay circuits 50, ..., 54, ..., and 57 except for the first delay circuit 53. In addition, the plurality of filters 210, ..., 212, 214, ..., and 217 may commonly receive the reference output x[n−N] of the first delay circuit 53. The plurality of filters 210, ..., 212, 214, ..., and 217 may, as described below in detail, output a new data signal b (b=[b[n], b[n−1] ... b[n−N], b[n−N−1] ... b[n−M+1]]$^T$) by performing respective filtering operations.

For example, a coefficient corresponding to the reference output x[n−N] of the first delay circuit 53, which is the main-cursor tap, may correspond to $a_N$ among the coefficients included in the second coefficient signal. For example, a third filter 217 may perform a filtering operation by receiving an output x[n−M+1] of a third delay circuit 57, among the delay circuits of the post-cursor tap, and the reference output x[n−N], and the third filter 217 may output a new data signal b[n−M+1]. The coefficient corresponding to the new data signal b[n−M+1] may be $a_{M-1}$ among the coefficients included in the second coefficient signal. Similarly, a second filter 214 may receive an output x[n−N−1] of a second delay circuit 54, among the delay circuits of the post-cursor tap, and the reference output x[n−N] and output a new data signal b[n−N−1]. The coefficient corresponding to the new data signal b[n−N−1] may be $a_{N+1}$ among the coefficients included in the second coefficient signal.

In some embodiments, the summing calculator 250 may receive the reference output x[n−N] and b[n], b[n−1], ..., b[n−M+1], which are outputs of the plurality of filters 210, ..., 212, 214, ..., and 217. The summing calculator 250 may drive the first output signal v[n] based on the coefficients included in the second coefficient signal corresponding to b[n], b[n−1], ..., b[n−M+1], which are outputs of the plurality of filters 210, ..., 212, 214, ..., and 217, and based on each of the outputs b[n], b[n−1], ..., b[n−M+1] by using a driver based on a pull up circuit and a pull down circuit. In this process, the summing calculator 250 according to embodiments may perform a summing calculation by using only an adder without a subtractor, as described below. Thereafter, the summing calculator 250 may output the first output signal v[n], which is an equalized data signal and may transmit the output first output signal v[n] via the channel 260.

Each of the plurality of filters 210, ..., 212, 214, ..., and 217 may include a difference filter or an average filter. The difference filter may output a value obtained by dividing the difference between two inputs by 2, and the average filter may output a value obtained by dividing the sum of the two inputs by 2. Because each of the plurality of filters 210, ..., 212, 214, ..., and 217 receives the reference output x[n−N] and the outputs of the plurality of delay circuits 50, ..., 53, 54, ..., and 57 corresponding thereto, and outputs the new data signal b, a new data signal b[n−k] may be expressed as Formula 1 below.

$$b[n-k] = 0.5 * \left( x[n-\text{main}] + \frac{w[k]}{|w[k]|} x[n-k] \right) \quad \text{[Formula 1]}$$

In other words, when the sign of w[k] is negative, a value obtained by dividing a difference between two inputs by 2 is to be output and a difference filter may be arranged as a filter corresponding to x[n−k], which is an output of a certain delay circuit. When a sign of w[k] is positive, a value obtained by dividing the sum of two inputs by 2 is to be output and an average filter may be arranged as a filter corresponding to x[n−k], which is an output of a certain delay circuit. Because the first output signal v[n], which is an equalized data signal, is weighted and output based on the coefficient 'a' corresponding to each of the outputs of the plurality of filters 210, ..., 212, 214, ..., and 217, a fact that the subtractor is not required in the driving process is to be shown by verifying mathematically that signs of the coefficient 'a' (that is, $a_0$, $a_1$, ..., and $a_{M-1}$) are all the same at the same time point.

As described above, the coefficient w of the feed forward equalizer 100 of the comparative example may be W=[$W_0$, $W_1$, ..., $W_N$, ..., and $W_{M-1}$]$^T$ and the output x of the plurality of delay circuits 50, ..., 53, 54, ..., and 57 may be represented as x =[x[n] x[n−1] ... x[n−M+1]]T. The new data signal b, which is the outputs of the plurality of filters 210, ..., 212, 214, ..., and 217 obtained by arranging the plurality of filters 210, ..., 212, 214, ..., and 217 may be expressed as b =[b[n] b[n−1] ... b[n−N] b[n−N−1] ... b[n−M+1]]$^T$ and the new coefficient 'a' of the feed forward equalizer 200 according to an embodiment corresponding to the new data signal b may be expressed as a =[$a_0$, $a_1$, ..., and $a_{M-1}$]$^T$. Equalized data v, which is the final output, may be expressed as v=[v[0] v[1] ... v[M−1]]$^T$. For example, when any one matrix, which converts the output x of the plurality of delay circuits 50, ..., 53, 54, ..., and 57 to the new data signal b, is designated as A(N×N matrix), the matrix A may be expressed as Formula 2.

$$A = \begin{bmatrix} 0.5 & \cdots & 0 & 0 & 0.5 & 0 & 0 & \cdots & 0 \\ \vdots & \ddots & \vdots & \vdots & \vdots & \vdots & \vdots & \ddots & \vdots \\ 0 & \cdots & 0.5 & 0 & 0.5 & 0 & 0 & \cdots & 0 \\ 0 & \cdots & 0 & -0.5 & 0.5 & 0 & 0 & \cdots & 0 \\ 0 & \cdots & 0 & 0 & 1 & 0 & 0 & \cdots & 0 \\ 0 & \cdots & 0 & 0 & 0.5 & -0.5 & 0 & \cdots & 0 \\ 0 & \cdots & 0 & 0 & 0.5 & 0 & -0.5 & \cdots & 0 \\ \vdots & \ddots & \vdots & \vdots & \vdots & \vdots & \vdots & \ddots & \vdots \\ 0 & \cdots & 0 & 0 & 0.5 & 0 & 0 & \cdots & 0.5 \end{bmatrix} \quad \text{[Formula 2]}$$

When the matrix A is divided by a matrix, in which column components have diagonal components and values, the result may be expressed as Formula 3 below.

$$A = 0.5 * \begin{bmatrix} 1 & \cdots & 0 & 0 & 0 & 0 & 0 & \cdots & 0 \\ \vdots & \ddots & \vdots & \vdots & \vdots & \vdots & \vdots & \ddots & \vdots \\ 0 & \cdots & 1 & 0 & 0 & 0 & 0 & \cdots & 0 \\ 0 & \cdots & 0 & -1 & 0 & 0 & 0 & \cdots & 0 \\ 0 & \cdots & 0 & 0 & 1 & 0 & 0 & \cdots & 0 \\ 0 & \cdots & 0 & 0 & 0 & -1 & 0 & \cdots & 0 \\ 0 & \cdots & 0 & 0 & 0 & 0 & -1 & \cdots & 0 \\ \vdots & \ddots & \vdots & \vdots & \vdots & \vdots & \vdots & \ddots & \vdots \\ 0 & \cdots & 0 & 0 & 0 & 0 & 0 & \cdots & 1 \end{bmatrix} + \quad \text{[Formula 3]}$$

$$0.5 * \begin{bmatrix} 0 & \cdots & 0 & 0 & 1 & 0 & 0 & \cdots & 0 \\ \vdots & \ddots & \vdots & \vdots & \vdots & \vdots & \vdots & \ddots & \vdots \\ 0 & \cdots & 0 & 0 & 1 & 0 & 0 & \cdots & 0 \\ 0 & \cdots & 0 & 0 & 1 & 0 & 0 & \cdots & 0 \\ 0 & \cdots & 0 & 0 & 1 & 0 & 0 & \cdots & 0 \\ 0 & \cdots & 0 & 0 & 1 & 0 & 0 & \cdots & 0 \\ 0 & \cdots & 0 & 0 & 1 & 0 & 0 & \cdots & 0 \\ \vdots & \ddots & \vdots & \vdots & \vdots & \vdots & \vdots & \ddots & \vdots \\ 0 & \cdots & 0 & 0 & 1 & 0 & 0 & \cdots & 0 \end{bmatrix}$$

In other words, a matrix on the left side may represent signs of the coefficient w of the feed forward equalizer 100 of the comparative example, and a matrix on the right side may represent a matrix, in which all components of the $N^{th}$ column has a value of 1 and the others thereof have a value of 0. In other words, the matrices may be expressed as follows. When a matrix indicating signs of the coefficient w (that is, $W_0, W_1, \ldots, W_N, \ldots,$ and $W_{M-1}$) is represented as $W_{sign}$ and a matrix in which all components of the $N^{th}$ column have a value of 1 and the others thereof have a value of 0 is represented as C, the matrix A may expressed as Formula 4.

$$A=0.5(\text{Wsign}+C) \qquad \text{[Formula 4]}$$

The output v of the feed forward equalizer 100 of the comparative example may be represented as $w^T x$, and the output v of the feed forward equalizer 200 according to an embodiment may be expressed as $a^T b = a^T(Ax) = a^T Ax$, and accordingly when $w = A^T a$, the two outputs may be verified as identical. When is $W_{abs}$ is a matrix with absolute values of elements of the matrix w, the matrix w may be expressed as $w = W_{sign} * W_{abs}$, and the matrix w may be expressed as Formula 5 below.

$$w = W_{sign} * W_{abs} = A^T a = 0.5 * (W_{sign} + C^T) a \qquad \text{[Formula 5]}$$

When $W_{sign}$ is multiplied to both sides, the result below may be obtained.

$$w_{abs} = 0.5 * (I + C^T) a = \begin{bmatrix} 0.5 & \ldots & 0 & 0 & 0 & 0 & 0 & \ldots & 0 \\ \vdots & \ddots & \vdots & \vdots & \vdots & \vdots & \vdots & \ddots & \vdots \\ 0 & \ldots & 0.5 & 0 & 0 & 0 & 0 & \ldots & 0 \\ 0 & \ldots & 0 & 0.5 & 0 & 0 & 0 & \ldots & 0 \\ 0.5 & \ldots & 0.5 & 0.5 & 1 & 0.5 & 0.5 & \ldots & 0.5 \\ 0 & \ldots & 0 & 0 & 0 & 0.5 & 0 & \ldots & 0 \\ 0 & \ldots & 0 & 0 & 0 & 0 & 0.5 & \ldots & 0 \\ \vdots & \ddots & \vdots & \vdots & \vdots & \vdots & \vdots & \ddots & \vdots \\ 0 & \ldots & 0 & 0 & 0 & 0 & 0 & \ldots & 0.5 \end{bmatrix} a \qquad \text{[Formula 6]}$$

In other words, an expression with respect to the coefficient a may be provided as Formulas 7 and 8 below.

$$a_{i \ne N} = 2|w_i| \qquad \text{[Formula 7]}$$

$$a_{i=N} = w_N - \sum_{\substack{i=0 \\ i \ne N}}^{M-1} |w_i| \qquad \text{[Formula 8]}$$

Accordingly, when a magnitude ratio of the coefficient $W_N$ (that is, the coefficient $W_N$ corresponding to the output x[n−N] of the first delay circuit 53) is greater than about 0.5, all of the signs of the coefficient a (that is, $a_0, a_1, \ldots,$ and $a_{M-1}$) are positive, and accordingly the outputs of the new data signal b, that is, the outputs of the plurality of filters 210, ..., 212, 214, ..., and 217, may all have the same sign, and thus, the summing calculator 250 may perform the driving by using only the summing operation without a subtraction operation.

Accordingly, the feed forward equalizer 200 may reduce an area occupied thereby by using a driver including a pull up circuit and a pull down circuit and may increase power efficiency. In addition, because the equalization operation is performed by using only the summing operation as described above, that is, as to be described later, only one of the P-channel metal-oxide-semiconductor (pMOS) transistors and the N-channel metal-oxide-semiconductor (nMOS) transistor is in an on (ON) state to drive, effects of power supply noise and accordingly a mismatch between transistors and pressure-voltage-temperature (PVT) variation, which are caused by simultaneously turning on the pMOS transistor and the nMOS transistor, may be reduced. In addition, because a current leakage may be reduced, a power leakage may also be greatly reduced. Because unnecessary power consumption in a high-speed input/output (I/O) operation is reducible and parasitic capacitance is eliminable, a high eye diagram may be obtained.

Figure 4A:
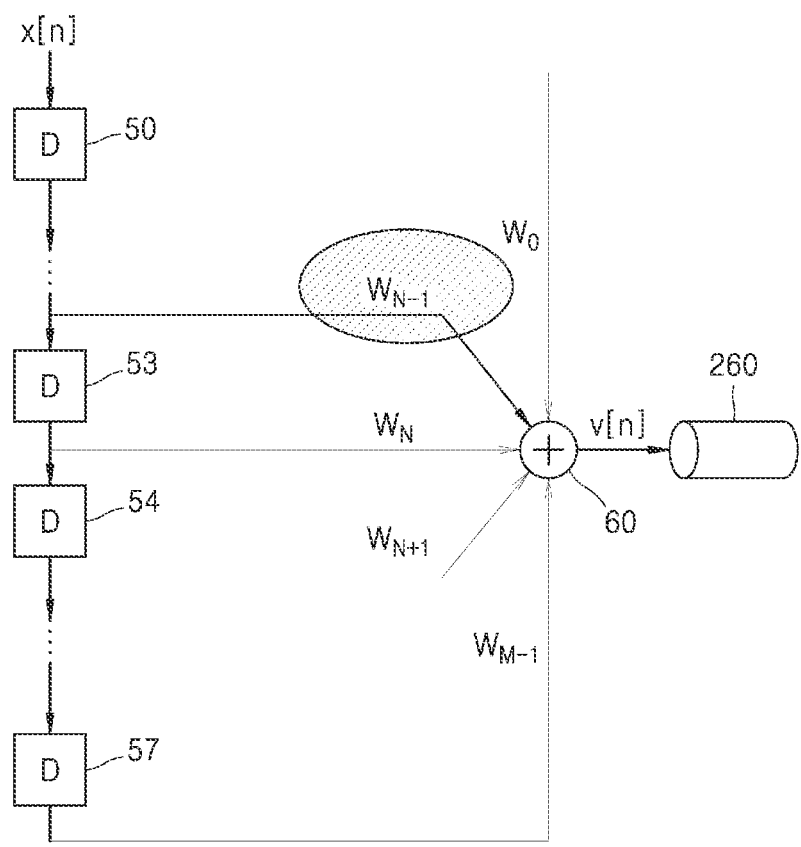
FIGS. 4A and 4B are circuit diagrams illustrating a method of arranging filters of an equalizer, according to embodiments.
Figure 4B:
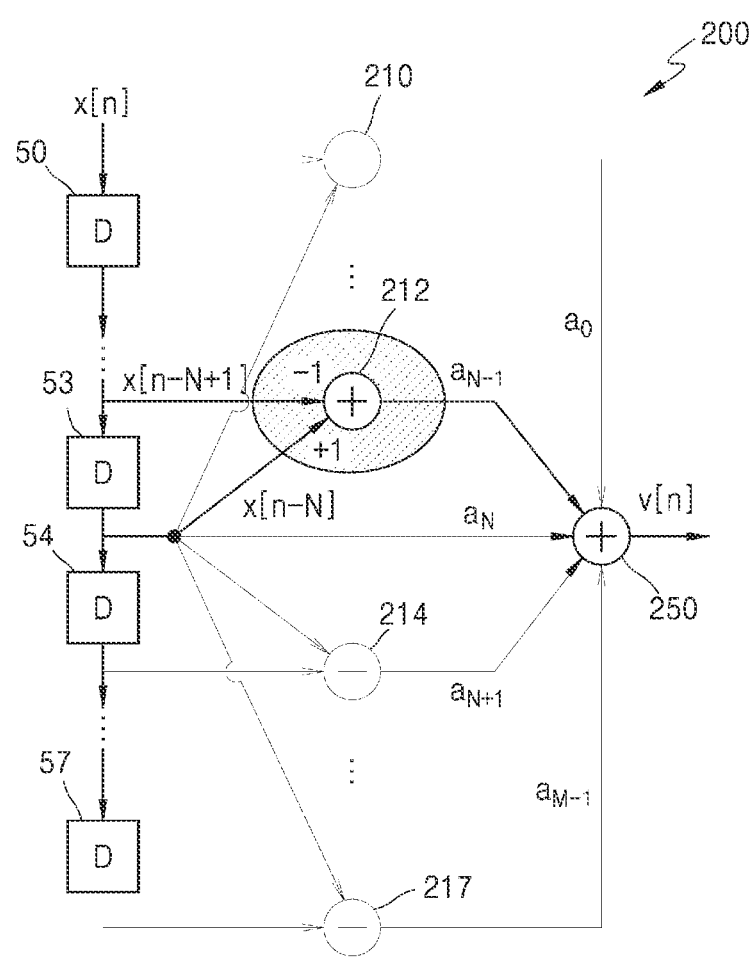

FIGS. 4A and 4B are circuit diagrams illustrating a method of arranging filters of an equalizer, according to embodiments.

Referring to FIGS. 2 and 4A, as described above, each of the outputs of the plurality of delay circuits 50, ..., 53, 54, ..., and 57 of the feed forward equalizer 200 of the comparative example may have the tap coefficient w (w= $[w_0, w_1, \ldots, w_N, \ldots,$ and $w_{M-1}]^T$) corresponding thereto. In addition, as described above with reference to Formula 1, that is, when a sign of w[k] is negative, a difference filter may be arranged for the output of the corresponding delay circuit. In other words, as illustrated in FIGS. 4A and 4B, when the w coefficient corresponding to x[n−N+1], which is the output of the pre-cursor tab closest to the first delay circuit 53, is negative, a first difference filter 212 may be arranged. Accordingly, the first difference filter 212 may be arranged to receive an output x[n−N+1] and a reference output x[n−N] and may output b[n−N+1]. In addition, as described above with reference to Formulas 7 and 8, the feed forward equalizer 200 may receive the second coefficient signal including information about the coefficient 'a' based on the coefficient w. For example, the coefficient 'a' corresponding to a new output b[n−N+1] may be $a_{N-1}$.

Figure 4C:
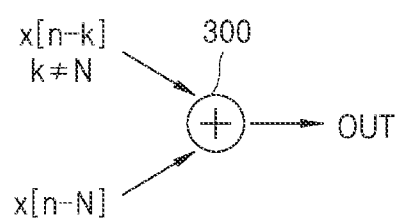
FIG. 4C is a diagram schematically describing an operating process of a filter of an equalizer, according to an embodiment.

FIG. 4C is a diagram schematically describing an operating process of a filter of an equalizer, according to an embodiment.

Referring to FIGS. 3 and 4A through 4C, when the sign of the coefficient w corresponding to each of the plurality of filters 210, ..., 212, 214, ..., and 217 is negative, a difference filter 300 may be arranged in each of the plurality of filters 210, ..., 212, 214, ..., and 217. The difference filter 300 may receive the output x[n−k] and the reference output x[n−N] of the corresponding delay circuit and may output OUT. Referring to Table 1, the output x[n] may have, in a sequence of data signals, the signal level thereof as a value of 1 (bit '1') or −1 (bit '0'). When the two input signals x[n−k] and x[n−N] are different from each other, the difference filter 300 may generate outputs for operating corresponding drivers, and when the two input signals x[n−k] and x[n−N] are the same, may generate outputs not for operating the corresponding drivers. When the two input signals x[n−k] and x[n−N] are different from each other, the sign of the output OUT may be output to be the same as the sign of the reference output x[n−N]. For example, a signal level 1 of the output OUT may include a signal for operating a driver including the pMOS transistor of the summing calculator 250. On the other hand, a signal level −1 of the output OUT may include a signal for operating a driver including the nMOS transistor of the summing calculator 250. When the two input signals x[n−k] and x[n−N] are the same as each other, a signal may be output which prevents both a driver including a pMOS transistor and a driver including an nMOS transistor from operating. In other words, the difference filter 300 may output one or more signals for determining whether a plurality of drivers of the summing calculator 250 are operated as described below in detail.

Figure 5A:
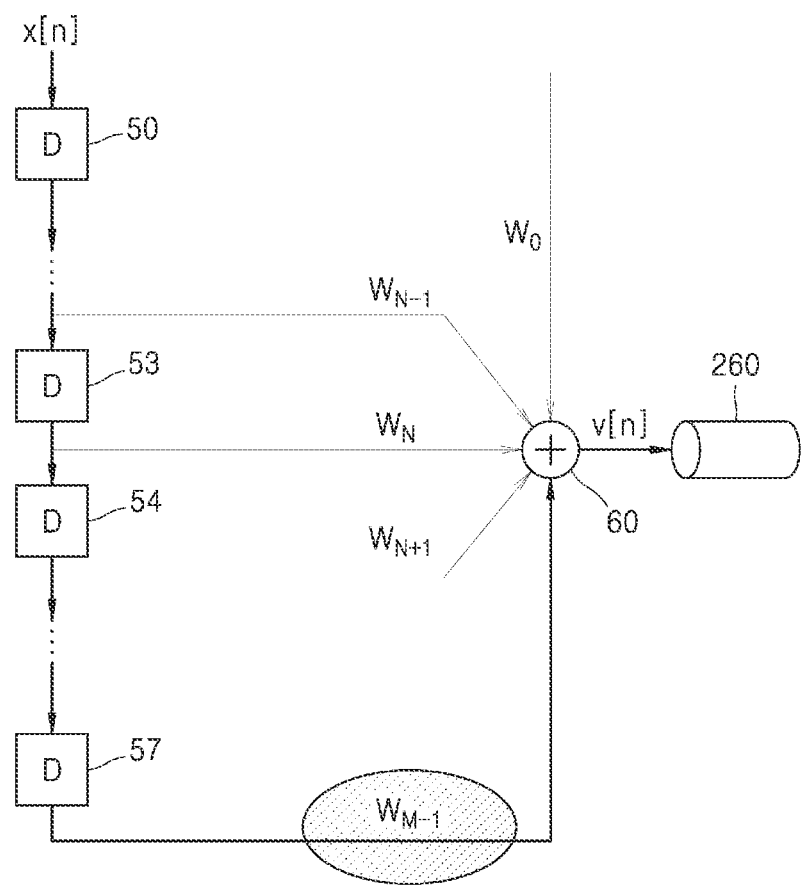
FIGS. 5A and 5B are circuit diagrams illustrating a method of arranging filters of a feed forward equalizer, according to embodiments.
Figure 5B:
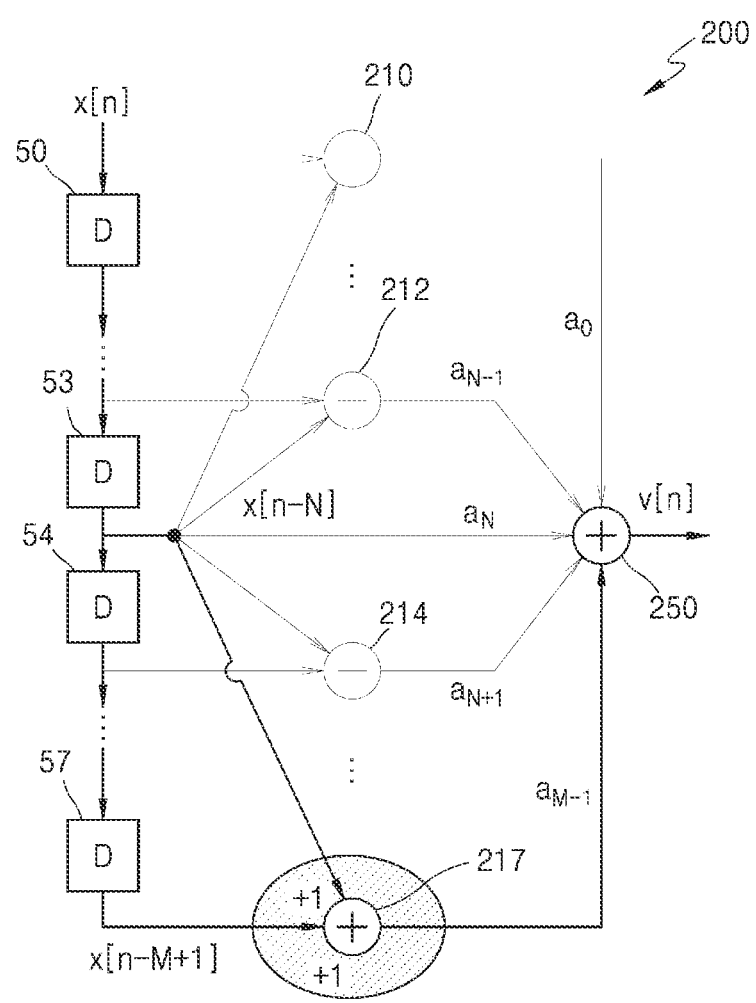

FIGS. 5A and 5B are circuit diagrams illustrating a method of arranging filters of the feed forward equalizer 200, according to embodiments.

Referring to FIGS. 2 and 5A, each of the outputs of the plurality of delay circuits 50, . . . , 53, 54, . . . , and 57 of the feed forward equalizer 200 may have the tap coefficient corresponding thereto $w=[w_0, w_1, \ldots, w_N, \ldots, \text{and } w_{M-1}]^T$ and as described above with reference to Formula 1. That is, when the sign of w[k] is positive, an average filter may be arranged for an output of a delay circuit corresponding to the coefficient. In other words, as illustrated in FIGS. 5A and 5B, when the w coefficient corresponding to x[n−N+1], which is the output of the post-cursor tab farthest to the first delay circuit 53, is positive, a first average filter 217 may be arranged. The first average filter 217 may be arranged to receive x[n−M+1] and the reference output x[n−N], and may output b[n−M+1]. As described above, the coefficient a corresponding to the new output b[n−M+1] may be $a_{M-1}$.

Figure 5C:
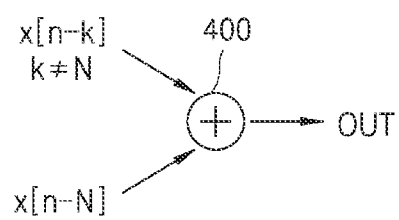
FIG. 5C is a schematic diagram of an operation process of a filter of a feed forward equalizer, according to another embodiment.

FIG. 5C is a schematic diagram of an operation process of a filter of an equalizer, according to another embodiment.

Referring to FIGS. 3 and 5A through 5C, when the sign of the coefficient w corresponding to each of the plurality of filters 210, . . . , 212, 214, . . . , and 217 is positive, an average filter 400 may be arranged in each of the plurality of filters 210, . . . , 212, 214, . . . , and 217. The average filter 400 may receive the output x[n−k] and the reference output x[n−N] of the corresponding delay circuit, and may provide an output OUT. Referring to Table 2, when the two input signals x[n−k] and x[n−N] are the same, the average filter 400 may generate outputs to operate corresponding drivers and when the two input signals x[n−k] and x[n−N] are different from each other, the average filter 400 may generate outputs not to operate corresponding drivers. When the two input signals x[n−k] and x[n−N] are the same, the sign of the output OUT may be output to be the same as the sign of the reference output x[n−N]. In other words, the average filter 400 may output one or more signals for determining whether a plurality of drivers of the summing calculator 250 are operated as described below in detail.

Figure 6:
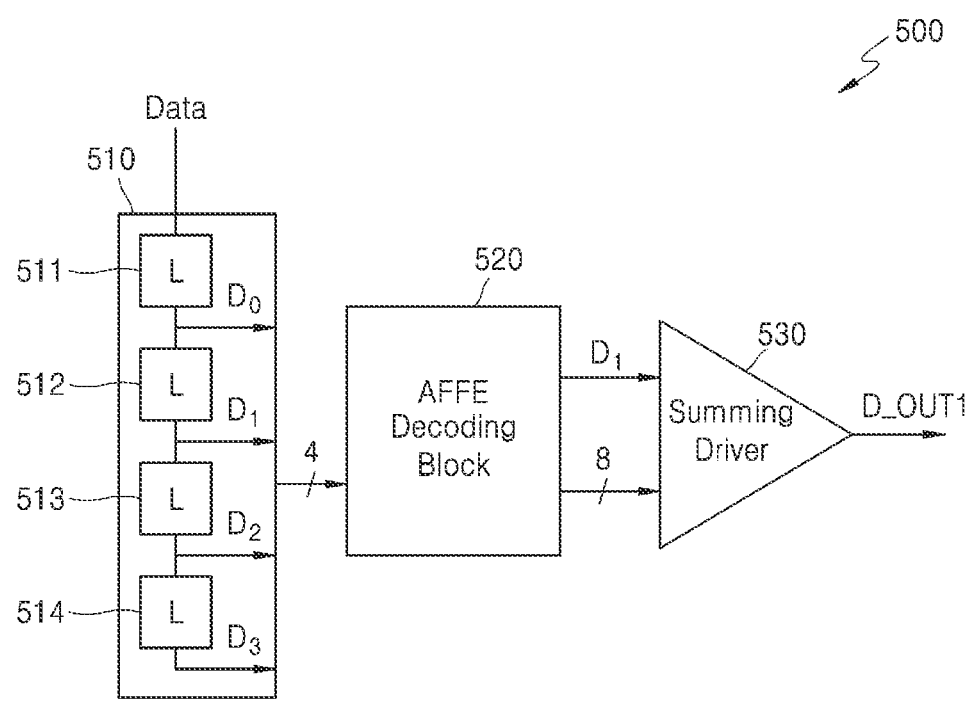
FIG. 6 is a block diagram of a structure of a feed forward equalizer, according to an embodiment.

FIG. 6 is a block diagram of a structure of a feed forward equalizer 500, according to an embodiment.

Referring to FIGS. 3 and 6, the feed forward equalizer 500 may include a delay circuit 510 including first through fourth latch circuits 511, 512, 513, and 514, a decoding block 520, and a summing driver 530. In some embodiments, the delay circuit 510 may include the first through fourth latch circuits 511, 512, 513, and 514 to receive and delay a data signal Data. The first latch circuit 511 may delay the data signal Data to output a first data signal $D_0$, and the second latch circuit 512 may delay the data signal Data to output a second data signal $D_1$. In the similar manner, the third latch circuit 513 may output a third data signal $D_2$ and the fourth latch circuit 514 may output a fourth data signal $D_3$. The delay circuit 510 may transmission the first through fourth data signals $D_0$, $D_1$, $D_2$, and $D_3$, which are delayed as described above, to the decoding block 520.

The decoding block 520 may include a plurality of filters. In the drawing, because four latch circuits, or the first to fourth latch circuits 511, 512, 513, and 514, are included, the number of filters may be three. However, the embodiment is not limited thereto. In other words, the delay circuit 510 may have various numbers of the plurality of filters, and accordingly, aspects of the number of filters may vary.

For example, when the second latch circuit 512 is assumed as a main tap, the second data signal $D_1$ may be defined as a reference output. Each of the plurality of filters may, as described above, receive a plurality of pieces of data, or $D_0$, $D_2$, and $D_3$ corresponding to each of the plurality of filters. As to be described below in detail, a plurality of filters included in the decoding block 520 may receive the second data signal $D_1$ and the data signal corresponding to each of a plurality of filters and may perform a filtering (or decoding) operation. Each of a plurality of filters may output two signals to determine whether a plurality of drivers of the summing driver 530 are operating. In addition, when the output voltage is close to a supply voltage or a ground voltage, the decoding block 520 may include a boost cursor to prevent a non-linear phenomenon as described below. The boost cursor may also output two signals to determine whether a boost driver is operating. As a result, a signal output from the plurality of filters and a signal output from the boost cursor, that is, an 8-bit signal, may be transmitted to the summing driver 530. On the other hand, the second data signal $D_1$, which is the reference output, may be transmitted to the summing driver 530 without passing through a filter.

The summing driver 530 may include a pull up circuit and a pull down circuit including a plurality of drivers, as described below. The summing driver 530 may determine whether a plurality of drivers of the pull up circuit and the pull down circuit are operating, based on the 8-bit signal and the second data signal $D_1$ received from the decoding block 520. In addition, the summing driver 530 may receive, from outside as described above, the second coefficient signal including information about the coefficient 'a' corresponding to the second data signal $D_1$, which is the reference output, and the outputs of the plurality of filters. As described above, the summing driver 530 may operate a plurality of drivers based on a plurality of signals received from the decoding block 520 and may adjust the intensity level of the driving based on the second coefficient signal. As a result, based on a plurality of outputs of the plurality of filters, the summing driver 530 may perform a summing operation of driving a second output signal D_OUT1 to be transmitted by using the summing operation.

Figure 7:
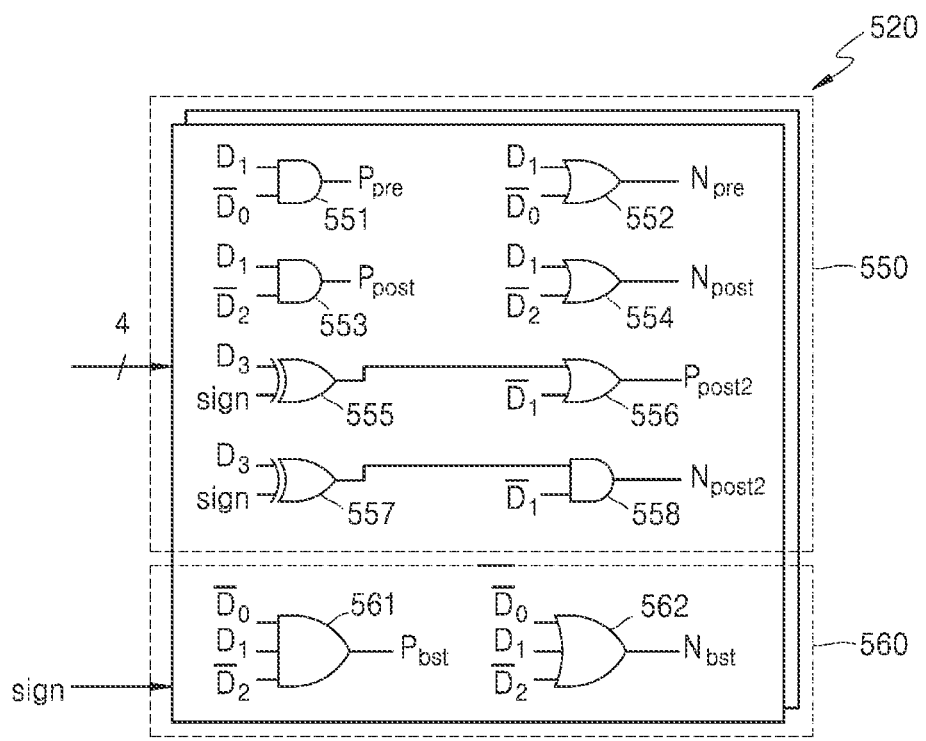
FIG. 7 is a diagram of a structure of a filter of an equalizer, according to an embodiment.

FIG. 7 is a diagram of a structure of a filter of an equalizer, according to an embodiment.

Referring to FIGS. 4C, 6, and 7, the decoding block 520 may include a plurality of filters 550 and a boost cursor 560. In the present diagram, an operation process of the difference filter 300 described above is described in detail. Among the plurality of filters 550, a difference filter receiving the first data signal $D_0$ may include first and second logic gates 551 and 552. Each of the first logic gate 551 and the second logic gate 552 may receive the second data signal $D_1$, which is the reference output, and an inverted signal of the first data signal $D_0$ corresponding to the difference filter, and may perform a filtering operation on the first pre-cursor tap, that is, the first data signal $D_0$ of the first latch circuit 511 closest to the main tap among the pre-cursor taps. The first logic gate 551 may output a signal for operating a driver including a pMOS transistor to perform a pull up driving, based on a $P_{pre}$ signal, which is the first data signal $D_0$ of the first latch circuit 511. The second logic gate 552 may output a signal for operating a driver including an nMOS transistor to perform a pull down driving, based on an $N_{pre}$ signal, which is the first data signal $D_0$ of the first latch circuit 511. In other words, only one driver among the driver including a pMOS transistor and the driver including an nMOS transistor is in the ON state. In a similar manner, a third logic gate 553 may output a $P_{post}$ signal operating a driver including a pMOS transistor for a pull up driving, based on the third data signal $D_2$ of a first post cursor tap adjacent to the main tap, which is the third latch circuit 513. A fourth logic gate 554 may also output an $N_{post}$ signal for operating a driver including an nMOS transistor to perform a pull down driving, based on the third data signal $D_2$ of the third latch circuit 513.

In some embodiments, fifth and sixth logic gates 555 and 556 may output a signal $P_{post2}$ for operating a driver including a pMOS transistor to perform a pull up driving, based on the fourth data signal $D_3$ of the fourth latch circuit 514 second adjacent to the main tap among the post-cursor taps. Seventh and eighth logic gates 557 and 558 may output the signal $N_{post2}$ for operating a driver including an nMOS transistor to perform a pull down driving, based on the fourth data signal $D_3$ of the fourth latch circuit 514. In this case, for example, a sign of the coefficient 'a' corresponding to the fourth latch circuit 514 may vary according to characteristics or the like of a channel. Accordingly, as illustrated so that a user may adjust a filter in response to a sign change of the coefficient 'a' corresponding to the fourth latch circuit 514, the fifth and sixth logic gates 555 and 556 and the seventh and eighth logic gates 557 and 558 may be configured. In this manner, a filter which may operate as both a difference filter or an average filter may be configured according to a sign change of a coefficient. In other words, to have compatibility with respect to various factors, such as channel characteristics, a filter having this type of structure may be configured.

However, structures of logic gates included in each of the plurality of filters 550 is not limited thereto. For example, each of the filters corresponding to the first pre-cursor tap and/or a first post-cursor tap may also have the same structure as a filter corresponding to a second post-cursor tap for compatibility. In other words, the structure of the plurality of filters 550 corresponding to each of the plurality of taps except the main tap may be implemented in various aspects, without being limited to the embodiment for outputting one or more signals to determine whether the plurality of drivers are operating.

The boost cursor 560 may include ninth and tenth logic gates 561 and 562. The boost cursor 560 may output signals $P_{bst}$ and/or $N_{bst}$, which are signals operating the boost driver of the summing driver 530, by using the ninth and tenth logic gates 561 and 562 as illustrated, to prevent a non-linear phenomenon that occurs when the second output signal D_OUT1 of the summing driver 530 approaches the supply voltage or ground voltage. For example, when the second output signal D_OUT1 to be transmitted approaches the supply voltage, the intensity of the pull up driving of a driver may decrease due to the reduced drain voltage. In this case, the voltage of the second output signal D_OUT1 to be transmitted may be raised to an appropriate level by operating the boost driver of the summing driver 530 by using a signal $P_{bst}$. The boost cursor 560 may, for example, output a signal when a driver corresponding to the pre-cursor tap and a driver corresponding to the post-cursor tap are simultaneously operating.

Figure 8:
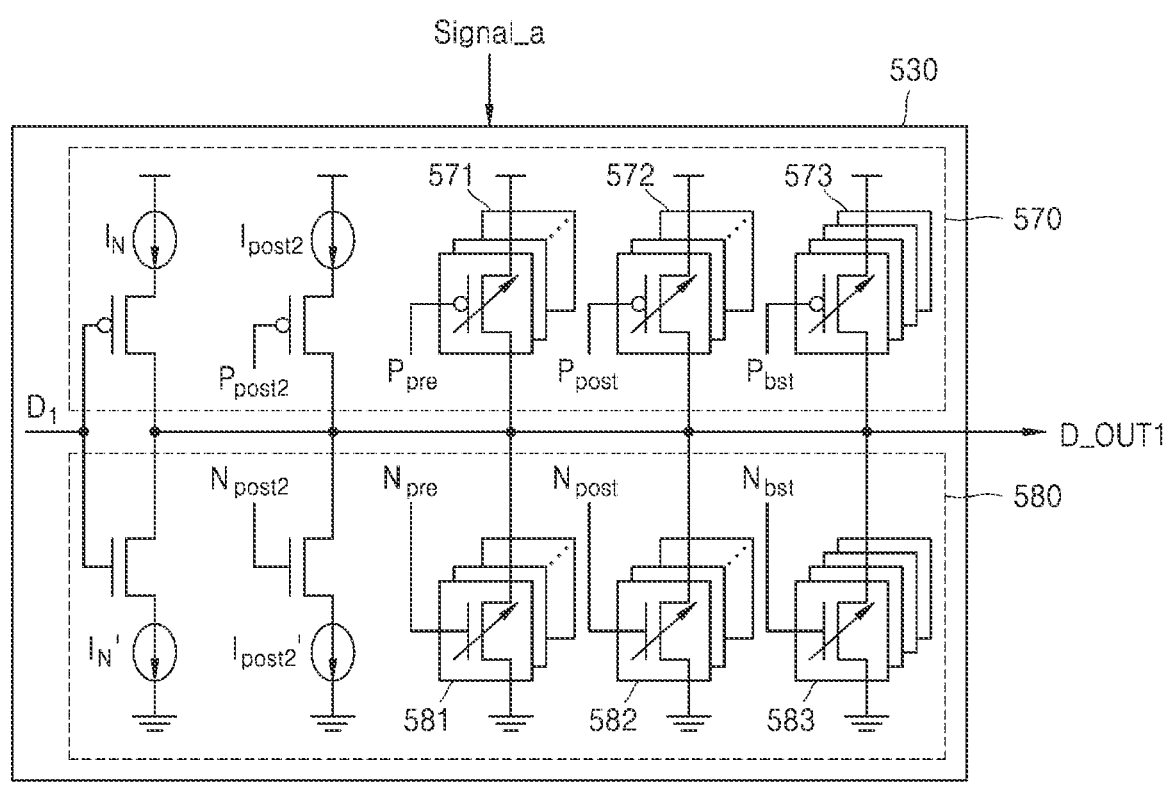
FIG. 8 is a diagram of a structure of a calculator of an equalizer, according to an embodiment.

FIG. 8 is a diagram of a structure of a calculator of an equalizer, according to an embodiment.

Referring to FIGS. 6 through 8, the summing driver 530 may include a pull up circuit 570 and a pull down circuit 580. The pull up circuit 570 may include a plurality of drivers $I_N$, $I_{post2}$, 571, 572, and 573 to raise the voltage of the output of the plurality of filters included in the decoding block 520 to an appropriate level or to increase the current intensity thereof to an appropriate intensity. The plurality of drivers $I_N$, $I_{post2}$, 571, 572, and 573 may perform a driving operation based on an operation of a pMOS transistor. The plurality of drivers $I_N$, $I_{post2}$, 571, 572, and 573 may include strong drivers 571, 572, and 573 for adjustment by using a voltage and weak drivers $I_N$ and $I_{post2}$ for adjustment by using a current. For example, a coefficient $a_1$ corresponding to the output of the second latch circuit 512, which is the main cursor tap, may be significantly less than a coefficient $a_0$ corresponding to the output of the first latch circuit 511, which is the first pre-cursor tap or a coefficient $a_2$ corresponding to the output of the third latch circuit 513, which is the first post-cursor tap. Accordingly, a first weak driver $I_N$, which is driven by using a current for more accurately finely adjusting an output with respect to the main-cursor tap may be included. As described above, the first data signal $D_1$, which is the reference output, may be transmitted to the summing driver 530 as illustrated without passing through a filter and may determine whether the first weak driver $I_N$ is operating. Similarly, a coefficient $a_3$ corresponding to the output of the fourth latch circuit 514, which is the second post-cursor tap, may be significantly less than the coefficient $a_0$ or $a_2$, and accordingly, may include a second weak driver $I_{post2}$ for an accurate output control. As described above with reference to FIG. 7, the operation of the second weak driver $I_{post2}$ may be determined based on the signal $P_{post2}$ transmitted from the decoding block 520.

The first and second strong drivers 571 and 572 may, as drivers corresponding to the first pre-cursor tap and the first post-cursor tap, that is, the first latch circuit 511 and the third latch circuit 513, respectively, perform a pull up driving operation based on filtered data. Whether to operate each of the first and second strong drivers 571 and 572 may be determined based on the signals $P_{pre}$ and $P_{post}$ transmitted from the decoding block 520. Whether to operate the third strong driver 573, as a driver corresponding to the boost cursor 560, may be determined, based on the signal $P_{bst}$, which is an output of a ninth logic gate 561 for preventing a non-linear phenomenon of the second output signal D_OUT1 to be transmitted as described above.

The feed forward equalizer 500 may determine whether each driver is driving by using the process described above, and as described above, may receive from outside a second coefficient signal Signal_a including information about the coefficient 'a', and may adjust the degree of the driving strength of operating drivers among the plurality of drivers $I_N$, $I_{post2}$, 571, 572, and 573.

In some embodiments, the pull down circuit 580 may include a plurality of drivers $I_{N'}$, $I_{post2'}$, 581, 582, and 583 to lower the voltage of the output of the plurality of filters included in the decoding block 520 to an appropriate level or to lower the current intensity to an appropriate intensity. The plurality of drivers $I_{N'}$, $I_{post2'}$, 581, 582, and 583 may perform a driving operation based on an operation of an nMOS transistor. The plurality of drivers $I_{N'}$, $I_{post2'}$, 581, 582, and 583 may include strong drivers 581, 582, and 583 for adjustment by using a voltage and weak drivers $I_{N'}$ and $I_{post2'}$ for adjustment by using a current. Whether a third weak driver $I_{N'}$ is operating may be determined by using the second data signal $D_1$ of the second latch circuit 512, which is the main-cursor tap, as described above. Whether each of the plurality of drivers $I_{post2'}$, 581, 582, and 583 is operating may be determined based on the signals $N_{post2}$, $P_{pre}$, $P_{post}$, and $P_{bst}$, which are the outputs of the decoding block 520. Detailed descriptions of the operation process given above are omitted.

As described above with reference to FIG. 7, a plurality of filters may output a signal for determining whether the second output signal D_OUT1 is driven by the pull up circuit 570 or the pull down circuit 580. In other words, because the filter determines whether the second output signal D_OUT1 is driven by the pull up circuit 570, which is pMOS transistor-operated, or the pull down circuit 580, which is nMOS transistor-operated, only one of the drivers of the pull up circuit 570 and the pull down circuit 580 may be operating with respect to each tap.

As a result, because the feed forward equalizer 500 may operate based on a driver including a pull up circuit and a pull down circuit, an additional area and parasitic capacitance due to resistance for linearity and impedance matching in driving operations may be reduced. Accordingly, the area of the transmitter may be reduced and power efficiency may be increased.

Also, because the feed forward equalizer 500 operates by using only a summing operation without a subtraction operation as described above, when the subtraction operation occurs, the effects of the power supply noise, mismatch between transistors, and the influence of PVT variation, which are caused by a simultaneous ON state of a pMOS transistor and an nMOS transistor, may be reduced, and accordingly, accurate and precise outputs may be obtained. In addition, because the feed forward equalizer 500 operates without a subtraction operation, a current leakage may be reduced and a current leakage may also be reduced. Furthermore, because the robustness to the coefficient error of the equalizer may be increased for the output of the filter, the signal distortion due to the coefficient error may be reduced.

Figure 9:
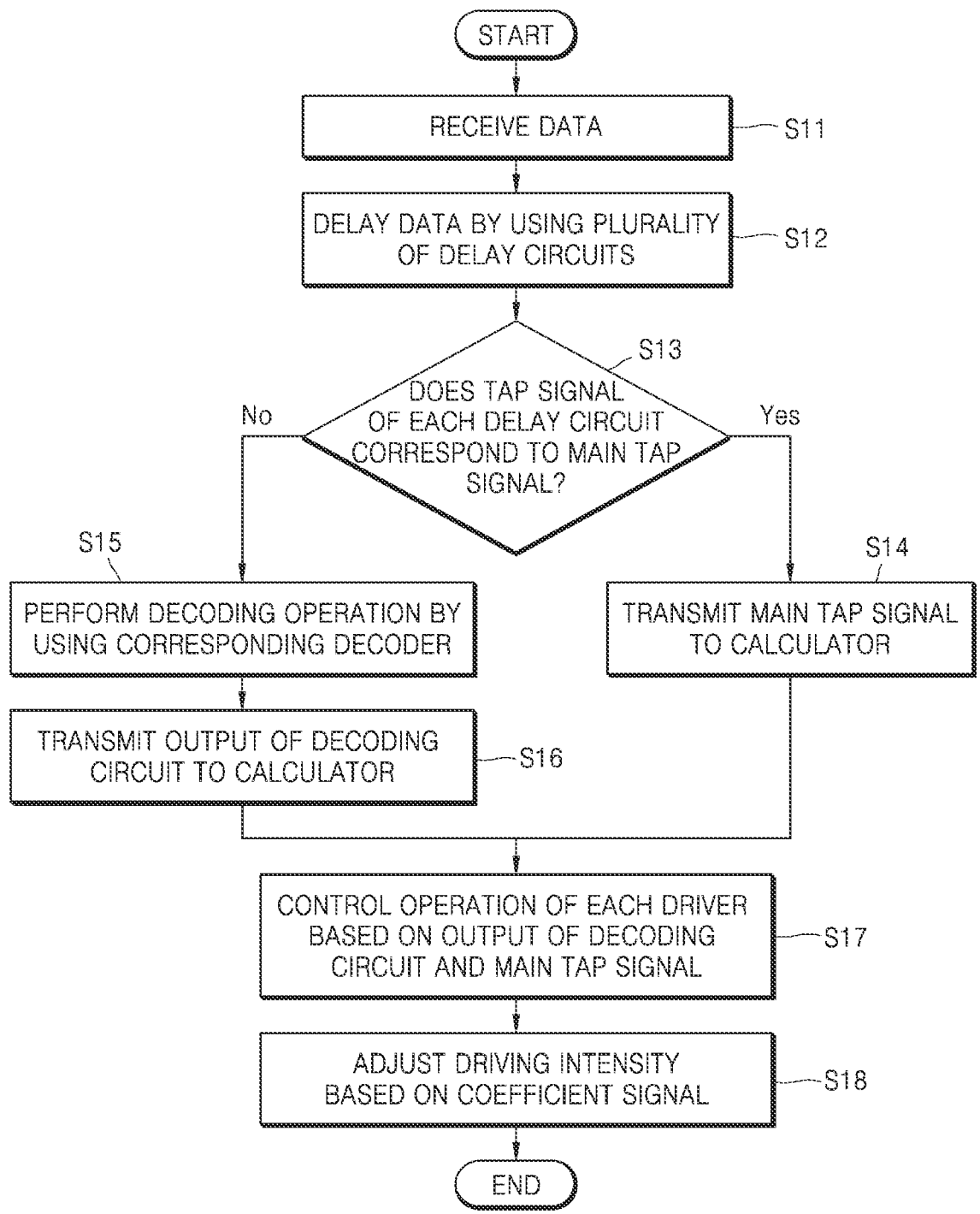
FIG. 9 is a flowchart of an operation process of an equalizer, according to an embodiment.

FIG. 9 is a flowchart of an operation process of an equalizer, according to an embodiment.

Referring to FIGS. 3 and 6 through 9, the feed forward equalizers 200 and 500 may receive, from outside, data signals to be transmitted (S11). The feed forward equalizers 200 and 500 may allow each of the plurality of delay circuits to output a signal by using the plurality of delay circuits (or latch circuits) connected to each other in series with respect to the received data signal (S12). One of the outputs of the plurality of delay circuits (that is, a tap signal) may be defined as a reference signal, and a delay circuit corresponding to the reference signal may be defined as the main tap. For example, as expressed in Formulas 7 and 8, a tap in which a magnitude ratio of the coefficient w corresponding thereto is greater than about 0.5 may become the main tap. Because a corresponding decoder (or a filter) is arranged in each of the taps except for the main tap, when the tap signal of each delay circuit is not a main tap signal, a decoding operation may be performed by using the decoder (S13 and S15). When the decoding operation is completed, a decoding circuit may transmit an output to a calculator (S16). On the other hand, the reference signal, which is a signal of the main tap, may be transmitted to the calculator without passing through a filter (S14).

As described above, the calculator may determine whether each of a plurality of drivers is operating, based on the outputs of the plurality of decoders of the decoding circuit and the reference signal (S17). When a transistor of each driver is operating in the ON state, the calculator may adjust an intensity level of driving, based on the reference signal and a coefficient corresponding to each of the plurality of decoders (S18).

Figure 10:
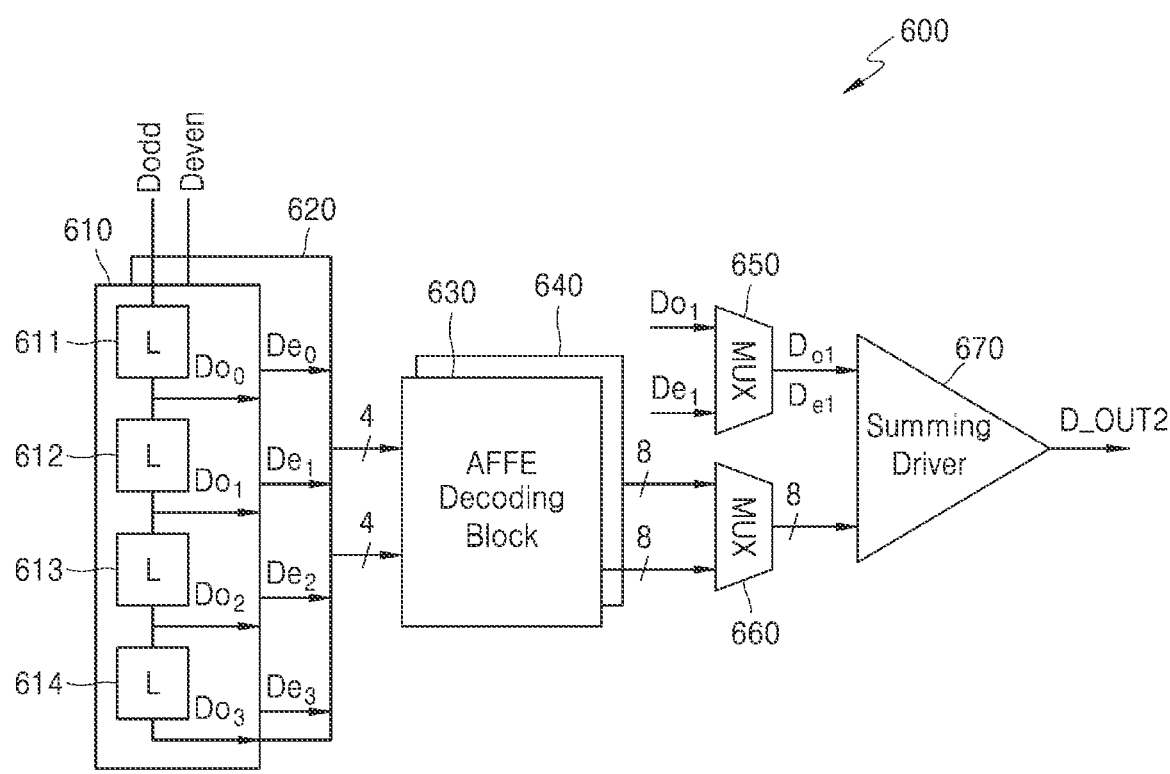
FIG. 10 is a block diagram of a structure of a feed forward equalizer, according to another embodiment.

FIG. 10 is a block diagram of a structure of a feed forward equalizer 600, according to another embodiment.

Referring to FIG. 10, the feed forward equalizer 600 may include a plurality of delay circuits 610 and 620 receiving a plurality of pieces of data in parallel. The feed forward equalizer 600 may include decoding blocks 630 and 640 for decoding delayed data, and because two pieces of data are processed in parallel, the feed forward equalizer 600 may include a first multiplexer 650 and a second multiplexer 660 so that pieces of data are selected and output to a summing driver 670. In the present drawing, duplicate descriptions given above with reference to FIG. 6 are omitted.

In some embodiments, each of the fifth delay circuit 610 and the sixth delay circuit 620 may receive a first data signal Dodd and a second data signal Deven in parallel. The fifth delay circuit 610 may include a plurality of latch circuits 611, 612, 613, and 614, and each of the plurality of latch circuits 611, 612, 613, and 614 may delay received data and respectively output each of a plurality of data signals $D_{o0}$, $D_{o1}$, $D_{o2}$, and $D_{o3}$. Similarly, the sixth delay circuit 620 may also output each of a plurality of data signals $D_{e0}$, $D_{e1}$, $D_{e2}$, and $D_{e3}$ by using the plurality of latch circuits. In the present drawing, because four latch circuits are used, each of the outputs of the fifth delay circuit 610 and the sixth delay circuit 620 may be 4 bits. However, the embodiment is not limited thereto. In other words, the number of latch circuits included in each delay circuit may vary, and accordingly, the number of bits of data to be output may vary.

The decoding blocks 630 and 640 may receive the outputs of the fifth delay circuit 610 and the sixth delay circuit 620 and may perform a decoding operation (or a filtering operation) as described below. Because a 4-bit signal is received for each of the first data signal Dodd and the second data signal Deven, the outputs of the decoding blocks 630 and 640 may have an 8-bit output for each of the first and second data signals Dodd and Deven.

The first multiplexer 650 may directly receive main tap signals, to which a decoding process has not been applied. For example, when the main tap signal of the fifth delay circuit 610 is $D_{o1}$ and the main tap signal of the sixth delay circuit 620 is $D_{e1}$, as described above. Because the main tap signals $D_{o1}$ and $D_{e1}$ are transmitted to the summing driver 670 without the decoding process, the first multiplexer 650 may receive the main tap signals $D_{o1}$ and $D_{e1}$ and output each of the main tap signals $D_{o1}$ and $D_{e1}$. Each of the main tap signals $D_{o1}$ and $D_{e1}$ may be transmitted to the summing driver 670, and it may be determined whether a weak driver corresponding to the main tap is operating. The second multiplexer 660 may receive outputs of the decoding blocks 630 and 640, to which the decoding process has been applied. As described above, because the outputs of the decoding blocks 630 and 640 for each of the first data signal Dodd and the second data signal Deven are signals determining whether the plurality of drivers of the summing driver 670 are operating, the second multiplexer 660 may transmit the decoding results for the first data signal Dodd and the second data signal Deven to the summing driver 670. For example, when an equalization operation on the first data signal Dodd is to be performed, the first multiplexer 650 may select $D_{o1}$ and transmit $D_{o1}$ to the summing driver 670 and the second multiplexer 660 may select the outputs of the decoding blocks 630 and 640 with respect to the first data signal Dodd and transmit the selected outputs to the summing driver 670. The summing driver 670 may perform a driving operation on a third output signal D_OUT2 based on the signals received from the first multiplexer 650 and the second multiplexer 660.

In this manner, a faster high-speed I/O interface may be provided by processing a plurality of pieces of data in parallel.

Figure 11:
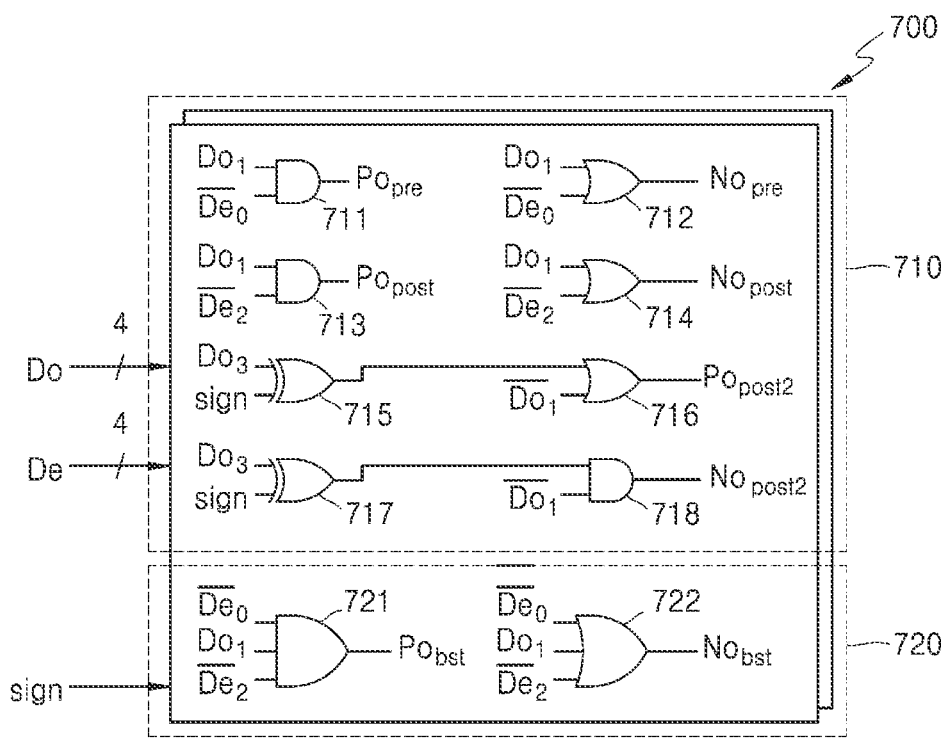
FIG. 11 is a diagram of a structure of a filter of an equalizer, according to another embodiment.

FIG. 11 is a diagram of a structure of a filter of an equalizer, according to another embodiment.

Referring to FIGS. 3, 6, 10, and 11, a first decoding block 700 of the feed forward equalizer 600 may include decoding blocks 630 and 640. The first decoding block 700 may include a plurality of filters 710 and a boost cursor 720. In the present diagram, an operation process of the difference filter 300 with respect to the first data signal Dodd is described. The difference filter (or decoder) receiving the data signal $D_{oO}$ may include an eleventh logic gate 711 and a twelfth logic gate 712. Each of the eleventh logic gate 711 and the twelfth logic gate 712 may perform a decoding operation (or filter operation) by receiving a main tap signal, $D_{O1}$, and an inverted signal of $D_{e0}$, a signal corresponding to a pre-cursor tap among tap signals of the second data signal ($D_{even}$). In this manner, the eleventh logic gate 711 may output a signal $P_{Opre}$ for operating a driver including a pMOS transistor for a pull-up driving based on the data signal $D_{e0}$. In this manner, the twelfth logic gate 712 may output a signal $N_{Opre}$ for operating a driver including an nMOS transistor for a pull-down driving based on the data signal $D_{e0}$. As described above, by using the signals $P_{Opre}$ and $N_{Opre}$, only one of the drivers including the pMOS transistors and the drivers including the nMOS transistors may be controlled to be in the ON state. In the same manner, as described above with reference to FIG. 7, the plurality of filters may output signals ($P_{Opost}$, $N_{Opost}$, $P_{Opost2}$, and $N_{Opost2}$), which determine whether a plurality of drivers (for example, strong drivers and/or weak drivers) of the summing driver 670 are operating by using a plurality of logic gates 713, 714, 715, 716, 717, and 718.

The boost cursor 720 may include a thirteenth logic gate 721 and a fourteenth logic gate 722, and the boost cursor 720 may, by using the thirteenth and fourteenth logic gates 721 and 722, output signals $P_{Obst}$ and/or $N_{Obst}$ driving the boost driver to prevent a non-linear phenomenon generated when the third output signal D_OUT2 of the summing driver 670 approaches a supply voltage or a ground voltage.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. A feed forward equalizer comprising:
   a plurality of delay circuits connected to each other in series and configured to delay input signals, the plurality of delay circuits including a first delay circuit configured to output a reference output;
   a plurality of filters respectively corresponding to outputs of the plurality of delay circuits except for the reference output, which is an output of a first delay circuit, among the plurality of delay circuits, and the input signals, wherein each of the plurality of filters is configured to receive an output of a delay circuit corresponding thereto among the plurality of filters, and the reference output; and
   a calculator configured to sum the reference output and to output of the plurality of filters.

2. The feed forward equalizer of claim 1, wherein:
   the plurality of filters comprise at least one first filter and at least one second filter,
   the at least one first filter generates an output for operating the calculator, when the output of the delay circuit corresponding thereto is different from the reference output, and
   the at least one second filter generates an output for operating the calculator, when the output of the delay circuit corresponding thereto is identical to the reference output.

3. The feed forward equalizer of claim 2, wherein each of the at least one first filter corresponds to a negative coefficient among coefficients corresponding to each of the outputs of the plurality of delay circuits.

4. The feed forward equalizer of claim 2, wherein each of the at least one second filter corresponds to a positive coefficient among coefficients corresponding to each of the outputs of the plurality of delay circuits.

5. The feed forward equalizer of claim 2, wherein:
   the calculator comprises a pull up circuit and a pull down circuit, and
   the pull up circuit and the pull down circuit are configured to drive output signals based on the outputs of the plurality of filters.

6. The feed forward equalizer of claim 5, wherein the at least one first filter is configured to output one or more signals for determining whether the pull up circuit and the pull down circuit are operating, based on comparison of the reference output with an output of the delay circuit corresponding thereto.

7. The feed forward equalizer of claim 5, wherein the at least one second filter is configured to output one or more signals for determining whether the pull up circuit and the pull down circuit are operating, based on determination of whether the reference output is identical to an output of the delay circuit corresponding thereto.

8. The feed forward equalizer of claim 5, wherein the calculator is configured to receive a coefficient signal from outside and adjust driving intensity levels of the pull up circuit and the pull down circuit based on the coefficient signal.

9. The feed forward equalizer of claim 8, wherein the coefficient signal is adjusted by external control.

10. The feed forward equalizer of claim 5, wherein each of the pull up circuit and the pull down circuit comprises one or more strong drivers and one or more weak drivers.

11. The feed forward equalizer of claim 10, wherein the reference output controls an operation of one weak driver among the one or more weak drivers of the pull up circuit and the pull down circuit.

12. The feed forward equalizer of claim 10, wherein each of the pull up circuit and the pull down circuit further comprises at least one boost driver.

13. A feed forward equalizer comprising:
a delay circuit configured to receive input data, wherein the delay circuit comprises a plurality of latch circuits configured to output a plurality of tap signals by sequentially delaying the input data;
a decoding circuit configured to receive output data of the delay circuit, the decoding circuit comprising a plurality of decoders configured to perform a decoding operation corresponding to each of the plurality of tap signals except for a reference tap signal, which is a tap signal of a first latch circuit, each of the plurality of decoders is configured to perform the decoding operation by receiving the reference tap signal and a tap signal corresponding thereto among the plurality of decoders; and
a calculator configured to sum outputs of the decoding circuit.

14. The feed forward equalizer of claim 13, wherein:
the plurality of decoders comprise at least one first decoder and at least one second decoder,
the at least one first decoder is configured to generate an output for operating the calculator, when the tap signal corresponding to each of the plurality of decoders is different from the reference tap signal, and
the at least one second decoder is configured to generate an output for operating the calculator, when the tap signal corresponding to each of the plurality of decoders is identical to the reference tap signal.

15. The feed forward equalizer of claim 14, wherein the decoding operation is performed by the at least one first decoder and the at least one second decoder, based on comparison of the reference tap signal with the tap signal corresponding thereto among the plurality of decoders.

16. The feed forward equalizer of claim 15, wherein the calculator is configured to comprise a pull up circuit and a pull down circuit and drive an output signal by controlling operations of the pull up circuit and the pull down circuit, based on the outputs of the decoding circuit according to the decoding operation.

17. The feed forward equalizer of claim 14, wherein:
each of at least one first decoder corresponds to a negative coefficient among coefficients corresponding to each of the outputs of the plurality of latch circuits, and
each of the at least one second decoder corresponds to a positive coefficient among coefficients corresponding to each of the outputs of the plurality of latch circuits.

18. A feed forward equalizer comprising:
a first delay circuit and a second delay circuit configured to receive a first input signal and a second input signal, and delay the first input signal and the second input signal by using a plurality of latch circuits, respectively;
a first decoding circuit and a second decoding circuit configured to generate a plurality of decoding signals by decoding output signals of the first delay circuit and the second delay circuit, respectively, each of the first decoding circuit and the second decoding circuit comprising a plurality of decoders respectively corresponding to the outputs of the plurality of latch circuits except for first and second reference outputs for performing a decoding operation;
a first multiplexer configured to receive the plurality of decoding signals of the first and second decoding circuits;
a second multiplexer configured to receive the first reference output, which is an output of a first latch circuit of the first delay circuit, and the second reference output, which is an output of a second latch circuit of the second delay circuit; and
a summing driver configured to receive and sum outputs of the first and second multiplexers.

19. The feed forward equalizer of claim 18, wherein:
the summing driver comprises a pull up circuit and a pull down circuit, and
the pull up circuit and the pull down circuit drive output signals based on the plurality of decoding signals and are configured to drive an output signal by controlling operations of the pull up circuit and the pull down circuit, based on the outputs of the first multiplexer and the second multiplexer.

20. The feed forward equalizer of claim 19, wherein the summing driver is configured to receive a coefficient signal, and control driving intensity levels of the pull up circuit and the pull down circuit based on the coefficient signal.

* * * * *